Feb. 3, 1970  A. GUENIN ET AL  3,493,312
IGNITION DEVICE

Filed Aug. 14, 1967  5 Sheets-Sheet 1

INVENTORS
ANDRÉ GUENIN
ERIC CHERVET
CONRAD ZELLWEGER

BY
ATTORNEYS

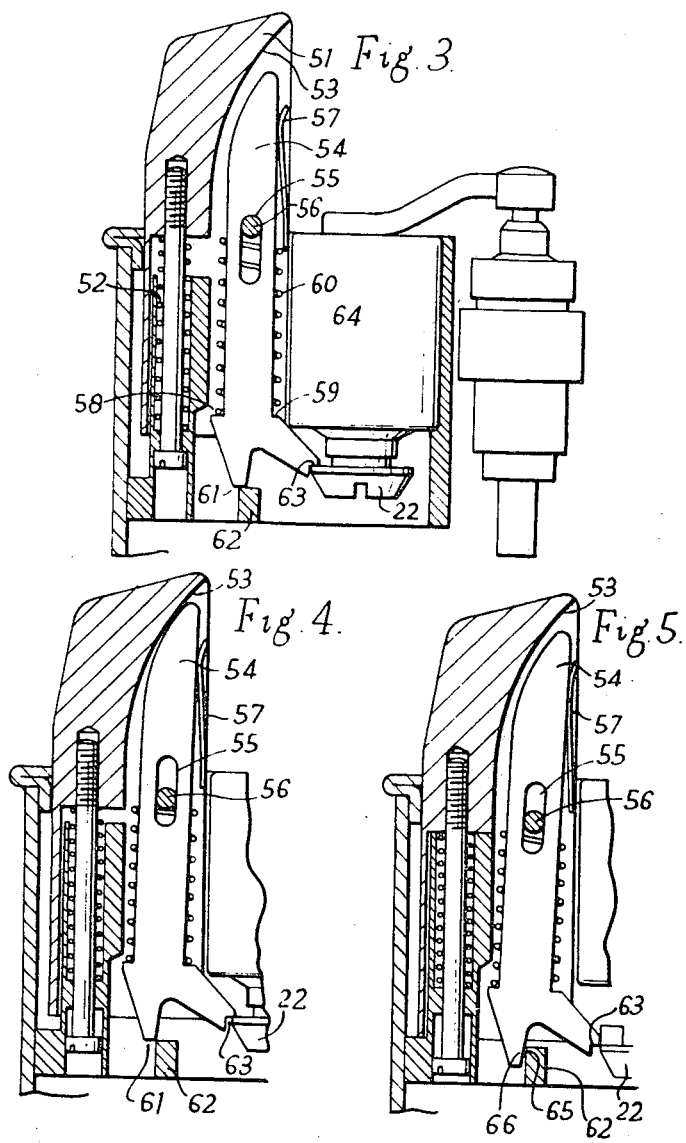

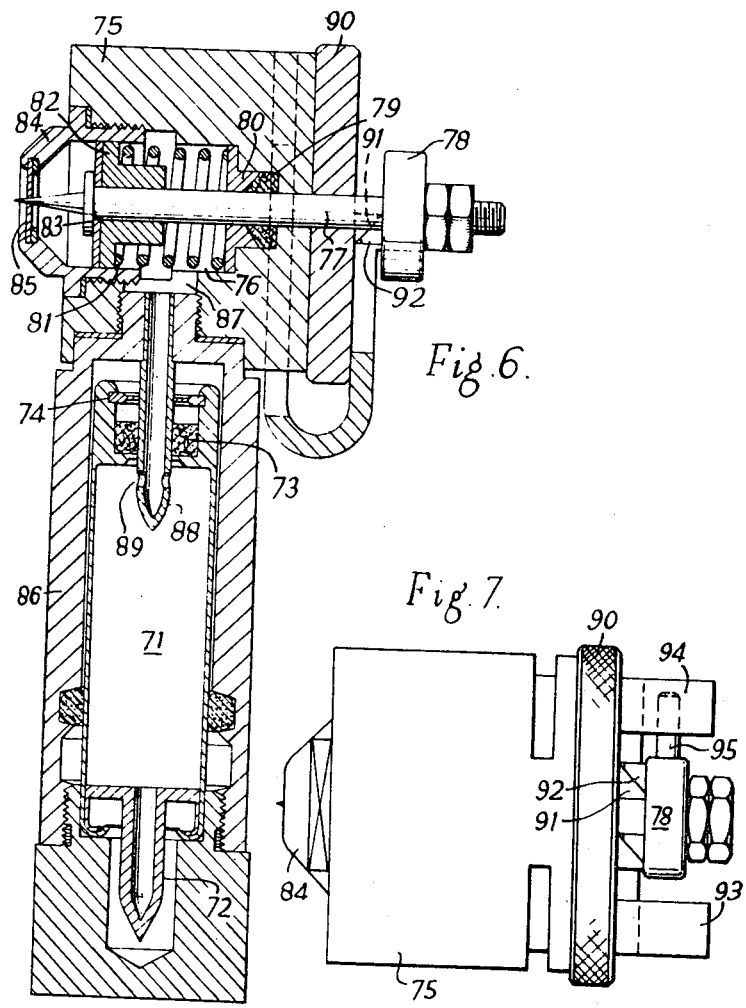

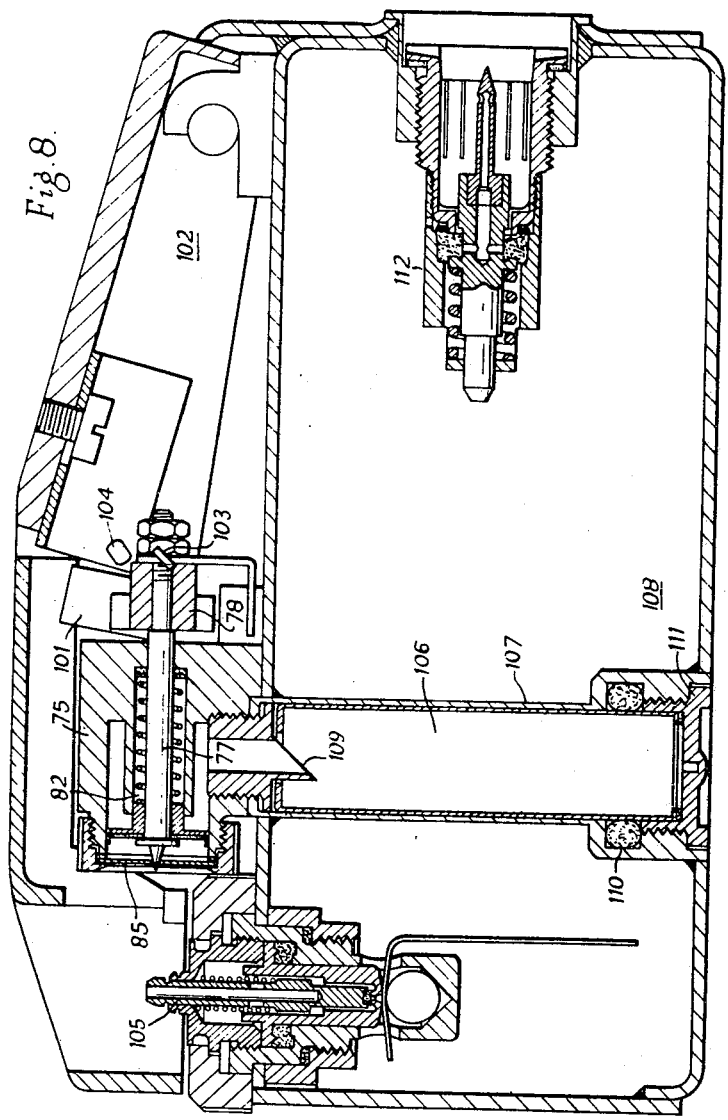

Feb. 3, 1970 A. GUENIN ET AL 3,493,312
IGNITION DEVICE
Filed Aug. 14, 1967 5 Sheets-Sheet 5

INVENTORS
ANDRÉ GUENIN
ERIC CHERVET
CONRAD ZELLWEGER
BY
ATTORNEYS

United States Patent Office 3,493,312
Patented Feb. 3, 1970

3,493,312
IGNITION DEVICE
André Guenin, Petit-Lancy, Eric Chervet, Presinge, and Conrad Zellweger, Chene-Bourgeries, Switzerland, assignors to La Nationale S.A., Geneva, Switzerland, a corporation of Switzerland
Filed Aug. 14, 1967, Ser. No. 660,418
Claims priority, application Great Britain, Aug. 19, 1966, 37,393/66
Int. Cl. F23d 11/38
U.S. Cl. 431—122                                    23 Claims

ABSTRACT OF THE DISCLOSURE

Igniting mechanism including a housing having an outlet port through which, when the mechanism is actuated, a quantity of pyrophoric substance is delivered to atmosphere, comprising a displacer means, in the form of a piston-like member, disposed between the outlet port and the reservoir for the pyrophoric substance for delivering a quantity of the substance to the outlet port when the mechanism is actuated, and a closure means in the form of a needle-like member which is reciprocated through the outlet port when the mechanism is actuated to seal the port and clear it of accumulated ash.

BACKGROUND OF THE INVENTION

This invention relates to a device for use in igniting fuel, particularly gaseous fuel, and which is operable to deliver to atmosphere as required a small metered quantity of a substance, such as a pyrophoric substance, which ignites spontaneously when mixed with air, or a hypergolic substance which combines with the fuel to produce combustion. For convenience the substance will be referred to herein as a pyrophoric substance. Such an ignition device is particularly useful in connection with domestic appliances such as heat or light producing appliances, or combustion devices for example cigarette lighters.

Since suitable pyrophoric substances are generally extremely expensive, it is necessary to assure that only a very small and accurately metered quantity of the substance shall be released to atmosphere when the device is operated.

Also, on account of the very small quantities of pyrophoric substance which have to be delivered at each operation of the device, the size of the outlet port through which the substance is delivered to atmosphere, and for that matter the size of the other components of the device, are small. Since, however, the reaction of such pyrophoric substances with air leads to the formation of ash, this results in the outlet port tending to become blocked by an accumulation of ash and this difficulty cannot easily be avoided owing to the size limitation of the various parts and the need for simplicity.

SUMMARY OF THE INVENTION

According to the present invention, there is provided an improved ignition device for delivering accurately metered amounts of pyrophoric substance to the atmosphere. Generally, the ignition device includes a housing adapted to contain or to be connected with a reservoir of pyrophoric substance, an outlet port in the housing through which the pyrophoric substance is to be delivered to atmosphere and displacer means for delivering metered amounts of pyrophoric substance from the reservoir to atmosphere through the port. The displacer means includes a piston-like member arranged in the housing between the reservoir and the port and is movable towards and away from the port to effect the delivery of the pyrophoric substance to the atmosphere. The present invention also avoids the problems associated with pyrophoric ignition devices due to the accumulation of ash by providing closure means in the form of a needle-like member which, after a quantity of pyrophoric substance has been delivered, is caused to protrude through the outlet to clear it of any ash that may have accumulated. The closure means is mounted on the displacer means for movement therewith and also acts to seal the outlet port when the displacer means is moved toward the outlet port so as to prevent the ingress of air while the device is not in operation; and for this purpose, the needle-like member is preferably tapered.

In a preferred constructional arrangement the outlet port is formed in a resilient diaphragm whereby the outlet port and a tapered needle can be resiliently engaged when the outlet port is sealed.

It will be appreciated that with this construction the end of the tapered needle will project through the port for a certain distance and will therefore act to maintain a clear channel through a possible accumulation of ash on the outside of the port or to break off such accumulation, as well as to clear the port itself. Preferably the arrangement is such that the needle when moving into the port is also rotated whereby to clear the port of ash and ensure a good seal. Additionally, there may be provided a scraper which is moved over the outer face of the device adjacent the port each time the device is operated.

In operation, the displacer means, that is, the piston-like member, which effectively divides the housing into two parts, is moved rapidly so that when moved away from the outlet port it acts to displace pyrophoric substance from that part of the housing which contains or is connected with the reservoir to that part containing the outlet port, whereas when moved towards the outlet port, it acts to displace pyrophoric substance from the housing through the outlet port. The movement away from the outlet port may possibly also cause some air to be drawn in through the outlet port.

The displacer may be a fairly good fit in the housing, in which case it may be provided with valve means operative to pass pyrophoric substance past the displacer when it is moved away from the outlet port and to prevent return of the pyrophoric substance when it is moved towards the outlet port. Alternatively, the displacer may be a comparatively loose fit in the housing, in which case it is not provided with valve means and the pyrophoric substance passes through the clearance between the displacer and housing. However, substantially the same effect is obtained when the displacer is moved rapidly.

According to a feature of the present invention, a mechanism for operating the device includes a spring which is stressed when the device is to be operated, the spring being coupled to the piston of the device so that on release of the spring it moves the piston rapidly in a direction to draw in a charge of pyrophoric substance, the return movement of the piston to eject the charge being controlled by a further spring.

In the use of an ignition device constructed in accordance with the present invention, it is important that the device shall not become too hot and it is therefore desirable to protect it from the heat of the flame produced by ignition of the fuel. To this end one or more heat shields may be arranged between the flame and the device. In accordance with the important feature of this invention, however, the device is arranged and disposed so as to eject pyrophoric substance from behind the burner through which fuel is supplied and in the direction of the path taken by such fuel on leaving the burner. In normal use this means that with the flame extending upwardly from the burner the device is arranged below the burner with its delivery port uppermost so as to eject the pyrophoric substance upwards.

According to yet another feature of the present invention, the reservoir for the pyrophoric substance is integral with the device. Conveniently, such reservoir is filled after assembly through a side arm which, after filling, may be severed so as to form a cold welded seal.

According to a further feature of the present invention, the reservoir for the pyrophoric substance is a self-contained replaceable cartridge.

BRIEF DESCRIPTION OF THE DRAWING

FIGURES 3, 4 and 5 show in section a preferred mechanism and its sequence of operating the ignition device of FIGURE 1;

FIGURE 6 is a drawing in section of a second embodiment of the ignition device;

FIGURE 7 is a plan view of the embodiment shown in FIGURE 6;

FIGURE 8 shows a lighter in section incorporating an ignition device similar to that shown in FIGURES 6 and 7;

DESCRIPTION OF THE PREFERRED EMBODIMENT

Figure 1:
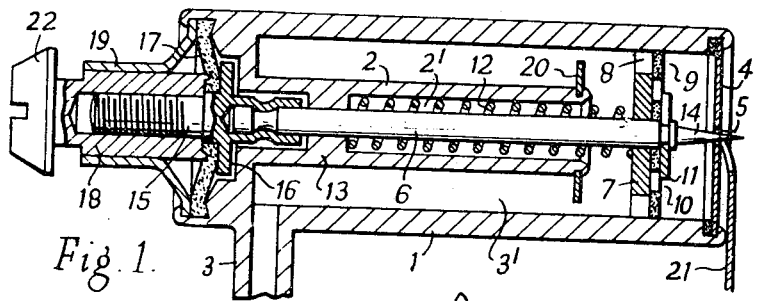
FIGURE 1 is a drawing in section of an ignition device to the present invention.

Referring to FIGURE 1, the ignition device of the present invention is shown removed from the lighter of FIGURES 1–5. The housing 1 of the ignition device is shown as tubular in configuration. It is formed as an impact extrusion in aluminium with a deep re-entrant portion 2 concentric with the main outer wall. A central bore 2' extends axially through the portion 2, and a hollow side limb 3 communicates with the space 3' between the re-entrant portion 2 and the outer wall of the housing. The open end of the housing 1 is closed by a a diaphragm 4 having a delivery port 5 aligned with the main axis of the housing 1. A rod 6 located within the bore 2' of the re-entrant portion 2, carries a displacer means having a rigid disc 7 apertured at 8 and a flexible disc 9 apertured at 10 which together form a piston-like member. Also the apertures in one disc are displaced with respect to those in the other disc so as to form a flap valve. These discs are held between a clip 11 and a helical spring 12, which spring is coaxial with the rod 6. One end of the spring 12 bears against the rigid disc 7 while its other end is seated against a section 13 of reduced diameter in the bore 2' through the re-entrant portion 2. The end of the rod 6 adjacent the discs 7 and 9 is formed at 14 as a tapered needle so as to penetrate and seal the outlet port 5. On the other side of the section 13 the rod carries a threaded spigot 15 with a flange 16. The spigot passes through the centre of a resilient diaphragm 17 which is held secured on the spigot by an internally threaded member 18. This member is formed, as shown, with a head 22 which is engageable by operating mechanism, not shown. The outer edge of the resilient diaphragm 17 is secured and sealed in the housing together with the wider rim of a funnel shaped member 19. The narrow portion of the member 19 serves to guide the outer surface of the threaded member 18.

The spring 12 biases the rod 6 towards the diaphragm 4 so that the tapered needle 14 enters the port 5 and seals it. As shown, the extreme end of the needle extends through the port so as to maintain a clear channel through any accumulation of ash formed on the outside. At the other end of the rod the diaphragm 17 provides a fluidtight seal between the rod 6 and the housing 1.

A mass of fibrous material (not shown) is packed in the space 3' between the re-entrant portion 2 and the outer wall of the housing and held there by means of a flange 20 provided on the re-entrant portion 2. This space 3' constitutes a reservoir for a pyrophoric substance; and the fibrous material is saturated or charged with the substance after the device has been assembled.

Since the handling of pyrophoric substance is hazardous, this substance is fed into the device by way of the side limb 3 which is sealed on completion by severing so that a cold weld is formed.

Finally, a scraper 21 is located on the exterior of the diaphragm 4. This scraper, which is forked so as to pass the protruding end of the tapered needle 14, is connected, by means not shown, to the operating mechanism of the device so that operation of the mechanism causes the scraper to clear the outside of the delivery port of ash after each discharge of pyrophoric substance.

The device is operated by a mechanism which pulls the rod 6 in a direction to compress the spring 12 and to withdraw the tapered needle 14 from the outlet port 5. The mechanism may also act to turn the rod through a small angle as it is pulled out. Movement of the piston assembly, comprising discs 7 and 9, tends to reduce the pressure on the side of the piston adjacent the diaphragm 4. This, together with the friction of the edge of the disc 9 against the internal wall of the housing 1, causes the discs 7 and 9 to part allowing pyrophoric substance to pass from one side to the other of the piston by way of the apertures 8 and 10. Thus the space on the side of the piston adjacent diaphragm 4 is charged with pyrophoric substance. The operating mechanism is arranged such that little or no dwell time occurs in the operation. As soon as the rod 6 has been moved to its limit in this direction, the mechanism immediately releases the rod allowing it to return to its initial position under the pressure produced by spring 12.

The return movement of the rod causes discs 7 and 9 to be brought together again, thereby closing the through passage for the pyrophoric substance. As the rod moves to assume its initial position, the piston 7, 9 thus ejects the pyrophoric substance through the outlet port 5. Any ash produced is immediately cleared as the tapered needle 14 penetrates and closes the port. At the termination of the delivery cycle the mechanism causes the scraper 21 to pass across the diaphragm 4, thereby removing ash deposited thereon.

Figure 2:
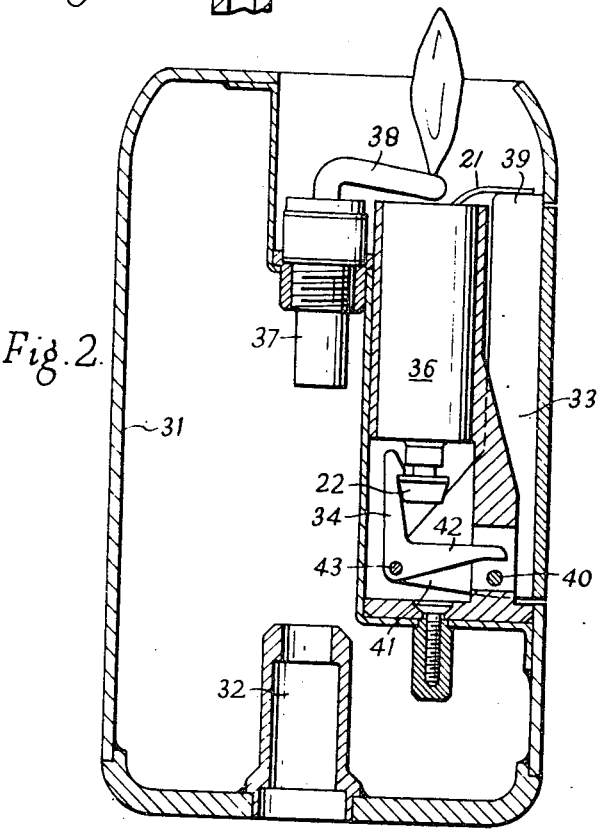
FIGURE 2 is a drawing, partly in section, showing a pocket lighter incorporating the device of FIGURE 1.

FIGURE 2 shows a pocket lighter equipped with an ignition device of the type shown in FIGURE 1. This lighter is shown as including a casing 31 which forms a reservoir for liquid butane, which is replenished by way of a known inlet valve 32. Pyrophoric substance is ejected, upwardly in the drawing, from the ignition device shown in outline at 36 to ignite butane vapour conducted from a known burner valve 37 by a pipe 38 to a point in the path of the pyrophoric substance. Operating mechanism for the device and the burner valve is located at the side of the casing 31 at 33. This mechanism comprises a manually operable lever 39 pivoted about a pin 40. An extension 41, which is provided on the lever 39 adjacent the pin 40, carries a cranked lever 34 one end of which is shown to be engaged with the head 22 of the rod 6 of the ignition device.

When the lever 39 is pivoted about the pin 40, the cranked lever 34 is carried downwardly together with the head 22 of the rod 6. Near the limit of travel for the lever 39 the free end 42 of the cranked lever 34 engages the pin 40 causing the lever 34 to rotate about this pin 40 as the lever 39 continues to move. Rotation of the lever 34 causes it to be disengaged from the head 22 of rod 6, thus allowing the rod 6, as hereinbefore described, to return to its original position and eject pyrophoric substance which on mixing with air ignites and in turn fires the butane vapour issuing from pipe 38.

An advantage of this arrangement is that the device is not directly affected by the flame.

Another mechanism for operating the ignition device of FIGURE 1 is shown in FIGURES 3, 4 and 5. In this mechanism a shorter version of the device of FIGURE 1 is used and it is again mounted so as to eject pyrophoric substance in a direction which is upwards in the drawing and from behind the fuel burner and the flame arising therefrom.

The mechanism comprises a finger piece 51 outwardly biased by means of a spring 52. The finger piece is formed with a cam surface 53 and carries a pin 56. A lever 54 has a slot 55 engaged by the pin 56 which pin, together with a leaf spring 57, serves to position the lever 54. The lower end of the lever 54 is provided with three abutment surfaces of which the uppermost 58 and 59 serve to seat one end of a spring 60 the other end of which bears against the pin 56. The second abutment surface 61 normally bears against a fixed stepped portion 62, while the third abutment surface 63 normally engages the head 22 of the operating rod of an ignition device 64 of the type hereinbefore described with reference to FIGURE 1.

In the rest position as shown in FIGURE 3, the cam surface 53 is clear of the lever 54, which is biased to assume an upright position with abutment surface 61 resting on the step 62 and abutment surface 63 fully engaged with the head 22. Downward movement of the finger piece 51 causes the pin 56 to move down the slot 55. During this movement of the finger piece 51 the lever 54 has remained in its initial position held so by the step 62. The pin 56, being connected to the finger piece, is also displaced, along the slot 55 compressing the spring 60. When the cam surface 53 engages the lever 54 it causes the top of the lever to be deflected. The deflection pivots the lever about the pin 56 so that the abutment surface 61 slips off the step 62 as shown in FIGURE 4. At this point the lever 54 is urged suddenly and rapidly downwards by the spring 60 without initially disengaging from the head 22 of the ignition device 64. Consequently, the piston of the device is moved equally suddenly and rapidly to displace pyrophoric substance into the part of the housing adjacent the outlet port as hereinbefore described. It will be seen from the drawing that once the surface 61 has slipped from the top of the step 62, the edge 65 of this step bears against the sloping surface 66 on the lever. The surface 66 is shaped so that as it bears against the edge of the step 62 it causes the lever to be turned as shown in FIGURE 5 still further about the pin 56 to finally disengage the surface 63 from the head 22. Thus released the piston moves suddenly and rapidly toward the outlet port and ejects pyrophoric substance from the device.

The arrangement is particularly advantageous since the speed of displacement of the piston in the device is entirely independent of the speed of movement of the finger piece 51, the piston being suddenly and rapidly moved by the spring 60 in one direction and by its spring 12 (FIGURE 1) in the other dirrection. As in FIGURE 2, suitable means are provided for opening the burner valve at the proper time.

The mechanism may also be arranged so that the head 22 is moved downwards, it is also turned through a small angle.

The embodiment shown in FIGURES 6 and 7 uses a separate replaceable cartridge reservoir 71 for the pyrophoric substance. This cartridge is filled by means of a tube 72 located at one end and is finally sealed by a cold weld formed as the tube is severed. At the other end of the cartridge there is provided a rubber seal 73 dimensioned to be self-sealing when pierced by a needle, surmounted by a frangible seal 74.

The device itself comprises a housing 75 through which there extends a stepped bore 76. Located within this bore there is a rod 77 formed as a tapered needle at one end, the other end extending through and beyond the narrowest portion of the bore 76 where on the outside of the housing the rod carries a toothed member 78. A sealing ring 79 surrounds the rod and is held under pressure by a washer 80, which is forced against the ring 79 by a helical spring 81. The spring bears on the one hand against the washer 80 and on the other hand against a piston 82 which is formed as a loose fit upon the rod 77 and fits loosely within the surrounding bore. Movement of the piston is constrained by the spring 81 and a flange 83 formed on the rod adjacent its needle end. Between the flange and the piston there is a flexible disc which acts as a simple flap valve allowing pyrophoric substance to pass from one face of the piston to the other when the piston is moved in one direction away from the outlet port; but when moved in the opposite direction, the disc effectively seals the space around the periphery of the piston to prevent return flow.

The stepped bore is closed at its widest end by a screw threaded cap 84. This cap has a central aperture closed by a thin diaphragm 85 provided at its centre with an outlet port normally closed by the needle end of rod 77.

The cartridge 71 is protected by means of a tubular casing 86. One end of the casing is formed to make a fluidtight connection with a cross bore 87 communicating with the bore 76, while the other end is provided with a cap to facilitate the replacement of the cartridge. The end of the casing 86 connected to the bore 87 has an inwardly projecting hollow needle 88 with a cross bore 89. This needle pierces the frangible diaphragm 74 and passes through the rubber seal 73 so that pyrophoric substance may pass by way of the hollow needle from the cartridge 71 to the interior of the device.

The method of metering and ejection of pyrophoric substance in the embodiment shown in FIGURE 6 is similar to that shown in FIGURE 1. Movement of the piston to bring the needle point from the outlet port tends to lower the pressure on the needle side of the piston, thereby causing pyrophoric substance to pass around the periphery of the piston 82. On returning the piston to its original position, the pyrophoric substance is ejected and the needle is reseated in the outlet port clearing it of ash and sealing it against the ingress of air.

The mechanism for operating this embodiment comprises a wheel 90 mounted so as to rotate about the rod 77. Sawtooth shaped projections 91 extend axially from the wheel and engage with complementary teeth 92 on the member 78. As shown in FIGURE 7, a sheet metal bracket secured to the housing 75 is shaped to provide two stop members 93 and 94 which cooperate with a pin 95 extending radially from the member 78 to limit the angle through which the ror can rotate.

In operation, the wheel 90 is rotated by hand, initially causing rod 77 to rotate by virtue of the coupling provided by the saw teeth 91 and 92, rotation of the rod is terminated by the pin 95 being brought into engagement with the stop 94. When rotation of the rod 77 has been terminated, further rotation of the wheel 90 causes the rod 77 to move axially as the inclined surfaces of the sawtooth coupling ride over one another to bring them momentarily out of engagement. On reaching the maximum axial displacement, determined by the inclined surfaces of the sawtooth, the direction of movement is reversed as the respective halves of the sawtooth coupling step past one another to bring the two halves again into engagement and causing the rod 77 to move rapidly under pressure exerted by spring 81. Thus on the initial movement of the rod, pyrophoric substance is drawn into the space between the piston and the outlet port and on reversal of the direction of this displacement under the pressure exerted by spring 81, the pyrophoric substance is ejected through the outlet port, the latter being cleared of ash as the needle resumes its position to seal the port. By reversing the direction of rotation of the wheel, the needle may be turned without any axial displacement, so as to properly seat it in the outlet port. The total angular displacement in this reverse direction is limited by the pin 95 contacting the stop 93.

FIGURE 8 shows an ignition device which is basically the same as that described with reference to FIGURES 6 and 7 but in this case it is shown as forming part of a pocket lighter and the mechanism for rotating the tapered needle has been modified. The tooth member 78 is a pinion which meshes with a complementary rack 101 carried on a finger piece 102. Depression of the fingerpiece 102 causes the rack to rotate the pinion and so the rod 77, until an inclined lug 103 carried on the member 78, engages an inclined slot 104 in the finger piece 102. Further depression of the fingerpiece causes the lug 103 to slide in the inclined slot 104 and so produce an axial displacement of the rod 77 until, by continued rotation, the lug is released from the slot whereupon the rod returns to its original axial position, causing pyrophoric substance to be ejected towards a burner valve 105. When the fingerpiece 102 is released, the rod 77 is rotated in the opposite direction by the rack which ensures a good seal of the needle in the delivery port. The cartridge reservoir 106 used in this particular embodiment is a more simple construction than that described with reference to FIGURE 6. It is simply loaded into a tube 107, which extends through the butane reservoir of the lighter 108. The cartridge is engaged by a tube 109 cut at an angle so as to provide a sharp edge to puncture the end of the cartridge 106. The cartridge is securely held in a fluidtight fashion by means of a sealing ring 110 and cap 111. The butane reservoir of the lighter is replenished by a known inlet valve 112.

Figure 9:
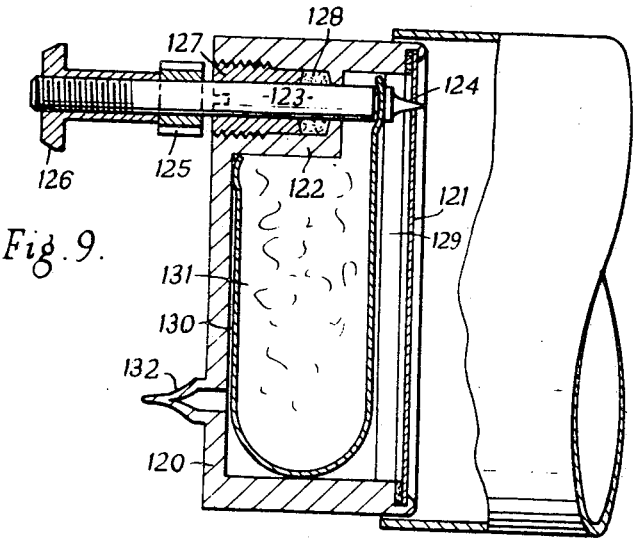
FIGURE 9 shows a third embodiment of the ignition device.

In FIGURE 9 there is shown yet another embodiment of the present invention in which the ignition device is used in lighting the burners of a gas cooker. In a known arrangement of gas cooker a pilot flame is positioned in a small chamber which is connected through a tube with each burner, the arrangement being such that when any burner is turned on, gas passes down a tube to the chamber where it is ignited by the pilot flame and blows back to light the burner. In this embodiment the ignition device takes the place of the pilot flame and is arranged to be actuated when a burner is turned on. In this form of the ignition device the pyrophoric substance and the metering mechanism are contained within a single box-like housing 120 of which a thin diaphragm 121 forms one entire wall. Part of the wall opposite the diaphragm is modified at 122 to provide a fluid-tight bearing for a rod 123 of which one end is formed with a tapered needle which fits in an outlet port 124 in the diaphragm 121. On the other end of the rod 123 there is provided a pinion 125 by which the rod may be rotated to ensure a good seal between the needle and the outlet port 124. The pinion has a flanged extension 126 by which the rod may be displaced axially. A bush 127 ensures a fluid-tight seal around the rod 123 by applying pressure to a sealing member 128.

The rod also carries a displacer in the form of a large diaphragm or piston-like member 129 which fits loosely in the housing 120 and a U-shaped leaf spring 130 which biases the rod 123 towards the outlet port 124. A charge of pyrophoric substance is fed into the housing 120 to a mass of porous material 131 by way of a tube 132 which is finally sealed by a cold weld produced when the tube is severed.

The operation of this embodiment is similar to that of FIGURE 1. When a gas burner is turned on, mechanism, not shown, causes the rod 123 to be axially displaced, thus withdrawing the tapered needle from the outlet port 124 and causing pyrophoric substance to pass around the edge of the piston 129 to the space on the needle side thereof. When the mechanism releases the rod 123, it is returned to its original position by the spring 130. The pinion 125 is provided so that the rod may be rotated by it to ensure a better seal when the tapered needle engages the outlet port 124.

Figure 10:
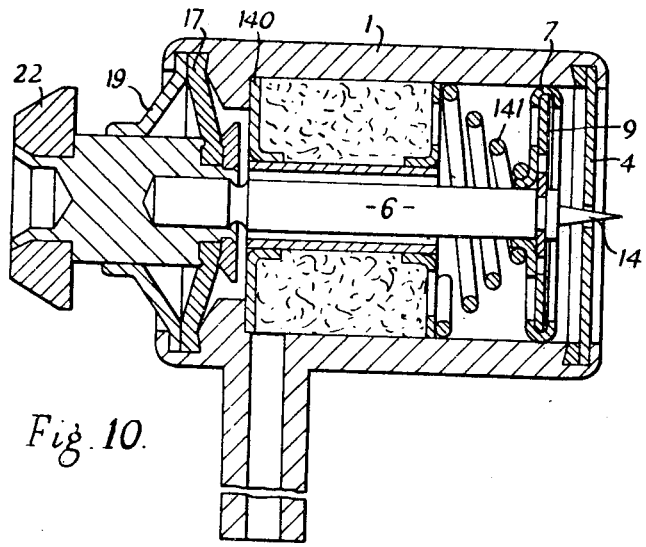
FIGURE 10 is a drawing in section of a fourth embodiment of the ignition device of the present invention.

A further embodiment of the ignition device of this invention is illustrated in FIGURE 10. In this arrangement, which is an improved and simplified version of that shown in FIGURE 1, the diaphragm 4 and the resilient diaphragm 17 and guide member 19 are again secured at their periphery with opposite ends of a simple tubular housing 1. However, this housing is not formed with the re-entrant portion 2 (FIG. 1). Instead, the fibrous material which carries the pyrophoric substance is housed in a bobbin 140 which closely fits the housing and has a bore through which the rod 6 passes. The rod is held in the position in which the needle 14 seals the outlet port in diaphragm 4 by a spring 141 which is located between the end of the bobbin 140 and the rigid disc or piston 7. It will be noted that the spring 141 is of conical configuration and has a large clearance from the wall of the housing. This avoids risk of jamming due to the presence of ash which can happen in the embodiment of FIGURE 1 owing to the small clearance between the spring 12 and the rod 6 and bore in the re-entrant portion 2. The arrangement of the rigid disc 7 and flexible disc 9 is the same as in the embodiment of FIGURE 1 but the periphery of the rigid disc 7 is rounded as shown to reduce the risk of this disc becoming jammed in the housing by the deposit of ash on the inside wall.

We claim:
1. An ignition device for use in igniting a fuel by the delivery of a small metered quantity of a pyrophoric substance to atmosphere comprising:
   (a) a housing for pyrophoric substance, said housing having an outlet port;
   (b) displacer means for delivering said quantity of pyrophoric substance to atmosphere through the port, said displacer means being positioned in the path of travel of said pyrophoric substance between a source of the pyrophoric substance and said outlet port for delivering said quantity of pyrophoric substance to atmosphere upon movement of said displacer means toward said outlet port; and
   (c) a needle-like member mounted for reciprocation through the port to maintain said port free of foreign substances.

2. Ignition mechanism as claimed in claim 1 further including:
   (a) means for rotating the needle-like member through a small angle as said displacer means is operated.

3. Ignition mechanism as claimed in claim 2 further including:
   (a) actuating mechanism for operating said displacer means; and
   (b) means connected to said actuating mechanism for scraping foreign substances from the outside of said housing adjacent the outlet port.

4. An ignition device as claimed in claim 1 wherein:
   (a) said displacer means comprises a piston-like member having valve means operative to pass pyrophoric substance past the piston when it is moved towards the source and to prevent return of the pyrophoric substance when it is moved towards the outlet port.

5. An ignition device for use in igniting a fuel by the delivery of a small metered quantity of a pyrophoric substance to atmosphere comprising:
   (a) a housing connected to a source of pyrophoric substance and having an outlet port;
   (b) closure means for sealing the outlet port; and
   (c) displacer means for delivering said quantity of pyrophoric substance to atmosphere through said outlet port, said displacer means comprising:
      (1) a piston-like member arranged in the housing between the reservoir and said outlet port for movement towards and away from said outlet port for delivering said quantity of pyrophoric substance to atmosphere upon movement of said piston-like member toward said outlet port.

6. An ignition device for use in igniting a fuel by the delivery of a small metered quantity of a pyrophoric substance to atmosphere comprising:
   (a) a housing in communication with a source of pyrophoric substance and having an outlet port;
   (b) displacer means for delivering a pyrophoric substance from said reservoir to atmosphere through said outlet port, said displacer means comprising:
      (1) a piston-like member disposed within the housing between the reservoir and said outlet port and dividing the housing into a first part on the side of said member facing said outlet port and a second part disposed on the opposite side of said member in communication with said source of pyrophoric substance;
   (c) passage means permitting flow of said pyrophoric substance past said piston-like member from the second part of said housing to the first part thereof; and
   (d) means for mounting said piston-like member for movement between a first position adjacent said outlet port and a second position spaced from said outlet port for displacing a quantity of pyrophoric substance from said source through said passage means and into the first part of said housing upon movement thereof from said first position toward said second position and for delivering said quantity of pyrophoric substance contained in the first part of the housing through said outlet port upon movement thereof from said second position toward said first position.

7. An ignition device as claimed in claim 6 wherein:
   (a) said passage means extends through said piston-like member; and
   (b) the periphery of said piston-like member is disposed in sealing engagement with the inner wall of said housing to prevent flow of said pyrophoric substance past said periphery between the first and second parts of said housing, said piston-like member including:
      (1) valve means for opening said passage means upon movement of said member from said first position toward said second position to pass pyrophoric substance through said passage means from the second part of said housing into the first part thereof and for closing said passage means upon movement of said member from said second position toward said first position.

8. An ignition device as claimed in claim 6 further including:
   (a) closure means connected to said displacer means for movement therewith into sealing relationship with said outlet port upon movement of said displacer means to said first position.

9. An ignition device as claimed in claim 8 wherein:
   (a) said displacer means is positioned within said housing with clearance between its periphery and the inner wall of said housing.

10. An ignition device as claimed in claim 8 wherein:
   (a) said closure means comprises a tapered needle-like member and extends through said outlet port when in said sealed relationship therewith.

11. An ignition device according to claim 10 wherein:
   (a) said housing includes a resilient diaphragm which constitutes a wall thereof; and
   (b) said output port is formed in said resiient diaphragm.

12. An ignition device as claimed in claim 8 wherein:
   (a) said housing includes a resilient diaphragm which constitutes a wall thereof; and
   (b) said outlet port is formed in siad resilient diaposed in sealing engagement with the inner wall of said housing to prevent flow of said pyrophoric substance past said periphery between the first and second parts of said housing, said piston-like member including:
      (1) valve means for opening said passage means upon movement of said member from said first position toward said second position to pass pyrophoric substance through said passage means from the second part of said housing into the first part thereof and for closing said passage means upon movement of said member from said second position toward said first position.

13. An ignition device as claimed in claim 12 wherein the valve means comprises:
   (a) a resilient member secured on the outlet port side of the piston, the piston and said resilient member being formed with apertures offset from each other whereby separation of the resilient member from the piston permits passage of pyrophoric substance therethrough.

14. An ignition device as claimed in claim 13 further including:
   (a) a rod supporting said piston within said housing, said rod having a portion extending through a wall of the housing for actuation by external operating means to reciprocate said piston.

15. An ignition device as claimed in claim 14 further including:
   (a) spring means for urging said piston toward said outlet port.

16. An ignition device as claimed in claim 15 further including:
   (a) a reservoir containing the source of pyrophoric substance sealably and releasably attached to the housing.

17. An ignition device as claimed in claim 16 wherein the housing includes:
   (a) a hollow needle for piercing a seal on the reservoir when said reservoir is attached to the housing.

18. An ignition device as claimed in claim 16 wherein:
   (a) the housing constitutes a self-contained replaceable cartridge containing the pyrophoric substance.

19. An ignition mechanism for use in igniting a fuel by the delivery of a small metered quantity of a pyrophoric substance to atmosphere comprising:
   (a) a housing for pyrophoric substance, said housing having an outlet port;
   (b) piston-like valve means reciprocably mounted within said housing toward and away from said outlet port for delivering said quantity of pyrophoric substance to atmosphere through said outlet port upon movement thereof toward said outlet port;
   (c) closure means reciprocably mounted within said housing for movement with said piston and into and out of said outlet port;
   (d) support means for supporting said piston-like valve means within said housing and having a portion extending through a wall of said housing; and
   (e) actuating means operatively connected to said support means for effecting reciprocation of said piston-like valve means toward and away from said outlet port to delivery of pyrophoric substance to atmosphere.

20. Ignition mechanism as claimed in claim 19 wherein said actuating means includes:
   (a) means for initially moving said piston-like valve means away from said outlet port and for thereafter releasing said piston-like valve means for movement toward said outlet port; and
   (b) spring means operatively connected to said piston-like valve means for urging it toward said outlet port, said spring means being stressed upon initial movement of said piston-like valve means away from said outlet port whereby the energy thus stored in the spring means effects a sudden movement of said piston-like valve means toward said outlet port upon its release.

21. Ignition mechanism as claimed in claim 20 said actuating means further includes:
   (a) a fingerpiece movably mounted to stress said spring means; and
   (b) a latch operative on the fingerpiece reaching a limiting position to release said piston-like valve means and said spring means.

22. Ignition mechanism as claimed in claim 19 wherein said actuating means includes:
   (a) first spring means for urging said piston-like valve means suddenly away from said outlet port; and
   (b) second spring means for urging said piston-like valve means suddenly toward said outlet port immediately following the movement thereof away from said outlet port.

23. Ignition mechanism as claimed in claim 22 further including:
   (a) a depressible fingerpiece for stressing said first spring means upon depression thereof;
   (b) means operatively connected to said fingerpiece for releasing said first spring means after stressing thereof to move said piston-like valve means suddenly away from said outlet port and to stress said second spring means; and
   (c) latch means for releasing said second spring means after stressing thereof to move said piston-like valve means suddenly toward said outlet port.

References Cited

UNITED STATES PATENTS

| | | | |
|---|---|---|---|
| 2,193,270 | 3/1940 | Coleman | 431—123 X |
| 2,363,098 | 11/1944 | Tullis | 431—123 |
| 3,085,411 | 4/1963 | Daugherty | 431—267 X |
| 3,106,238 | 10/1963 | Bruce | 431—267 X |
| 3,174,310 | 3/1965 | Genoud | 431—344 X |

EDWARD J. MICHAEL, Primary Examiner

U.S. Cl. X.R.

431—123, 267

PO-1050
(5/69)

UNITED STATES PATENT OFFICE
CERTIFICATE OF CORRECTION

Patent No. 3,493,312          Dated February 3, 1970

Inventor(s) Andre Guenin et al.

It is certified that error appears in the above-identified patent and that said Letters Patent are hereby corrected as shown below:

Column 2, line 67, "with the important" should read --with an important--

Column 5, line 63, "so that the" should read --so that as the--

Column 6, line 52, "ror" should read --rod--

Column 9, line 69, "resiient" should read --resilient--

Column 9, lines 72-74, "(a) said housing includes a resilient diaphragm which constitutes a wall thereof; and (b) said outlet port is formed in siad resilient dia" should read --(a) said passage means extends through said piston-like member; and (b) the periphery of said piston-like member is dis--

SIGNED AND
SEALED
AUG 18 1970

AUG. 18, 1970

(SEAL)
Attest:

Edward M. Fletcher, Jr.
Attesting Officer

WILLIAM E. SCHUYLER, JR.
Commissioner of Patents